US009734439B2

(12) United States Patent
Hara et al.

(10) Patent No.: US 9,734,439 B2
(45) Date of Patent: Aug. 15, 2017

(54) IMAGE PROCESSING APPARATUS AND METHOD THEREOF

(71) Applicant: CANON KABUSHIKI KAISHA, Tokyo (JP)

(72) Inventors: Yuji Hara, Machida (JP); Hisashi Ishikawa, Urayasu (JP); Yusuke Yamamoto, Tokyo (JP); Kenta Hosaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/287,323

(22) Filed: May 27, 2014

(65) Prior Publication Data

US 2014/0355010 A1 Dec. 4, 2014

(30) Foreign Application Priority Data

Jun. 4, 2013 (JP) ................................ 2013-118305
May 16, 2014 (JP) ................................ 2014-102733

(51) Int. Cl.
*G06K 15/02* (2006.01)
*H04N 1/407* (2006.01)
*H04N 1/40* (2006.01)
*H04N 1/52* (2006.01)

(52) U.S. Cl.
CPC ......... *G06K 15/1881* (2013.01); *H04N 1/407* (2013.01); *H04N 1/40081* (2013.01); *H04N 1/52* (2013.01)

(58) Field of Classification Search
CPC ...... G06K 15/1881; H04N 1/407; H04N 1/52; H04N 1/40081
USPC ........................................................ 358/1.12
See application file for complete search history.

(56) References Cited

U.S. PATENT DOCUMENTS 7,436,547 B2 * 10/2008 Kakutani ........... H04N 1/40087 358/1.2
8,040,559 B2 * 10/2011 Hashimoto ......... B41F 33/0009 358/1.9
2009/0086232 A1 * 4/2009 Ohira ................ H04N 1/00204 358/1.9
2009/0147287 A1 * 6/2009 Misawa ................... H04N 1/56 358/1.9
2012/0189209 A1 * 7/2012 Nakamura ............ G06T 3/4007 382/199
2012/0314234 A1 * 12/2012 Miyazaki ............... H04N 1/409 358/1.9
2013/0016374 A1 * 1/2013 Kawamoto ........ G03G 15/6585 358/1.9

(Continued)

FOREIGN PATENT DOCUMENTS

JP 2002-223347 A 8/2002

*Primary Examiner* — Houshang Safaipour
*Assistant Examiner* — Bharatkumar S Shah
(74) *Attorney, Agent, or Firm* — Carter, DeLuca, Farrell & Schmidt, LLP

(57) ABSTRACT

Multi-value image data is sampled for each predetermined pixel range to generate tone information of the pixel range. The generated tone information is stored in a storage unit. Attribute information representing the attribute of a pixel is generated from the multi-value image data, and the generated attribute information is stored in the storage unit. Halftone processing is performed on the multi-value image data based on the tone information and attribute information stored in the storage unit.

26 Claims, 11 Drawing Sheets

| | | | | | | | | | | | |
|---|---|---|---|---|---|---|---|---|---|---|---|
| 21 | 13 | 25 | 19 | 7 | 11 | 18 | 28 | 21 | 13 | 25 | 19 |
| 9 | 5 | 17 | 27 | 15 | 23 | 29 | 16 | 9 | 5 | 17 | 27 |
| 0 | 1 | 10 | 22 | 31 | 24 | 12 | 4 | 0 | 1 | 10 | 22 |
| 3 | 2 | 6 | 14 | 26 | 30 | 20 | 8 | 3 | 2 | 6 | 14 |
| 7 | 11 | 18 | 28 | 21 | 13 | 25 | 19 | 7 | 11 | 18 | 28 |
| 15 | 23 | 29 | 16 | 9 | 5 | 17 | 27 | 15 | 23 | 29 | 16 |
| 31 | 24 | 12 | 4 | 0 | 1 | 10 | 22 | 31 | 24 | 12 | 4 |
| 26 | 30 | 20 | 8 | 3 | 2 | 6 | 14 | 26 | 30 | 20 | 8 |
| 21 | 13 | 25 | 19 | 7 | 11 | 18 | 28 | 21 | 13 | 25 | 19 |
| 9 | 5 | 17 | 27 | 15 | 23 | 29 | 16 | 9 | 5 | 17 | 27 |
| 0 | 1 | 10 | 22 | 31 | 24 | 12 | 4 | 0 | 1 | 10 | 22 |
| 3 | 2 | 6 | 14 | 26 | 30 | 20 | 8 | 3 | 2 | 6 | 14 |
| 7 | 11 | 18 | 28 | 21 | 13 | 25 | 19 | 7 | 11 | 18 | 28 |
| 15 | 23 | 29 | 16 | 9 | 5 | 17 | 27 | 15 | 23 | 29 | 16 |

(56) References Cited

U.S. PATENT DOCUMENTS

| | | | | |
|---|---|---|---|---|
| 2013/0050716 | A1* | 2/2013 | Kubota ............. | G06K 15/1825<br>358/1.2 |
| 2014/0016141 | A1* | 1/2014 | Yamada ............. | G06K 15/1876<br>358/1.2 |

* cited by examiner

FIG. 2

| | | | | | | | | | | | |
|---|---|---|---|---|---|---|---|---|---|---|---|
| 21 | 13 | 25 | 19 | 7 | 11 | 18 | 28 | 21 | 13 | 25 | 19 |
| 9 | 5 | 17 | 27 | 15 | 23 | 29 | 16 | 9 | 5 | 17 | 27 |
| 0 | 1 | 10 | 22 | 31 | 24 | 12 | 4 | 0 | 1 | 10 | 22 |
| 3 | 2 | 6 | 14 | 26 | 30 | 20 | 8 | 3 | 2 | 6 | 14 |
| 7 | 11 | 18 | 28 | 21 | 13 | 25 | 19 | 7 | 11 | 18 | 28 |
| 15 | 23 | 29 | 16 | 9 | 5 | 17 | 27 | 15 | 23 | 29 | 16 |
| 31 | 24 | 12 | 4 | 0 | 1 | 10 | 22 | 31 | 24 | 12 | 4 |
| 26 | 30 | 20 | 8 | 3 | 2 | 6 | 14 | 26 | 30 | 20 | 8 |
| 21 | 13 | 25 | 19 | 7 | 11 | 18 | 28 | 21 | 13 | 25 | 19 |
| 9 | 5 | 17 | 27 | 15 | 23 | 29 | 16 | 9 | 5 | 17 | 27 |
| 0 | 1 | 10 | 22 | 31 | 24 | 12 | 4 | 0 | 1 | 10 | 22 |
| 3 | 2 | 6 | 14 | 26 | 30 | 20 | 8 | 3 | 2 | 6 | 14 |
| 7 | 11 | 18 | 28 | 21 | 13 | 25 | 19 | 7 | 11 | 18 | 28 |
| 15 | 23 | 29 | 16 | 9 | 5 | 17 | 27 | 15 | 23 | 29 | 16 |

FIG. 7A

| y \ x | 0 | 1 | 2 | 3 | 4 | 5 | 6 | 7 | 8 | 9 | ........ | |
|---|---|---|---|---|---|---|---|---|---|---|---|---|
| 0 | 21 | 13 | 25 | 19 | 7 | 11 | 18 | 28 | 21 | 13 | 25 | 19 |
| 1 | 9 | 5 | 17 | 27 | 15 | 23 | 29 | 16 | 9 | 5 | 17 | 27 |
| 2 | 0 | 1 | 10 | 22 | 31 | 24 | 12 | 4 | 0 | 1 | 10 | 22 |
| 3 | 3 | 2 | 6 | 14 | 26 | 30 | 20 | 8 | 3 | 2 | 6 | 14 |
| 4 | 7 | 11 | 18 | 28 | 21 | 13 | 25 | 19 | 7 | 11 | 18 | 28 |
| 5 | 15 | 23 | 29 | 16 | 9 | 5 | 17 | 27 | 15 | 23 | 29 | 16 |
| 6 | 31 | 24 | 12 | 4 | 0 | 1 | 10 | 22 | 31 | 24 | 12 | 4 |
| 7 | 26 | 30 | 20 | 8 | 3 | 2 | 6 | 14 | 26 | 30 | 20 | 8 |
| 8 | 21 | 13 | 25 | 19 | 7 | 11 | 18 | 28 | 21 | 13 | 25 | 19 |
| 9 | 9 | 5 | 17 | 27 | 15 | 23 | 29 | 16 | 9 | 5 | 17 | 27 |
| ⋮ | 0 | 1 | 10 | 22 | 31 | 24 | 12 | 4 | 0 | 1 | 10 | 22 |
| ⋮ | 3 | 2 | 6 | 14 | 26 | 30 | 20 | 8 | 3 | 2 | 6 | 14 |
| ⋮ | 7 | 11 | 18 | 28 | 21 | 13 | 25 | 19 | 7 | 11 | 18 | 28 |
| ⋮ | 15 | 23 | 29 | 16 | 9 | 5 | 17 | 27 | 15 | 23 | 29 | 16 |

IMAGE PROCESSING APPARATUS AND METHOD THEREOF

BACKGROUND OF THE INVENTION

Field of the Invention

The present invention relates to an image processing apparatus which performs halftone processing.

Description of the Related Art

An image processing apparatus receives print data from a host computer (PC) or the like, and generates a raster image capable of print processing from the print data. Then, the image processing apparatus performs image processing (to be referred to as "output correction" hereinafter) on RGB data (for example, 8 bits for each color: 256 tones), which is the raster image, to match a characteristic (to be referred to as an "output characteristic" hereinafter) unique to the output unit of the image processing apparatus. The image processing apparatus converts the number of tonality of the RGB data into the number of tonality reproducible by the output unit (to be referred to as "halftone processing" hereinafter), and prints. That is, multiple tones are expressed by color materials of several colors using an area coverage modulation method of changing the number of dots to be formed per unit area by halftone processing.

To synchronize with the operation of the output unit during the above-described processing, the image processing apparatus temporarily stores intermediate data in a storage (for example, a hard disk or dynamic random access memory (DRAM)) in the image processing apparatus. The intermediate data storage method includes a multi-value storage method of storing multi-value RGB data before halftone processing, and a binary storage method of storing binary data after halftone processing.

The binary storage method decreases the amount of data to be stored in comparison with the multi-value storage method, and can reduce the cost by reducing the storage capacity of the storage. However, halftone processing expresses tones by the area coverage modulation method. Thus, the information amount of binary data becomes smaller than that of multi-value data, decreasing the resolution of a character or line art. Note that "decreasing the resolution" means that an image blurs or crushes (for example, degradation of the edge of a character or line art).

The output characteristic depends on the remaining amount of color material and the type of printing medium, and represents a temporal change upon variations of the temperature and humidity of the output unit. Output correction comprises gamma correction processing of correcting density variations arising from, for example, a device difference. The gamma correction processing is processing on multi-value data, and it is difficult to perform the gamma correction processing on binary data after halftone processing. For this reason, when the output characteristic changes upon storing intermediate data, it is difficult for the binary storage method to obtain a high-quality printed image.

There is proposed a technique in which multi-value data and binary data are combined, the amount of data to be stored is decreased in comparison with the multi-value storage method, and output correction is possible on stored data. This technique performs image separation to separate print data into a character or line art (to be referred to as a "character/line art region" hereinafter) and an image having tonality (to be referred to as an "image region" hereinafter). The character/line art region is stored as high-resolution binary data without performing halftone processing. As for the image region, only part of multi-value data is stored as multi-value data in association with halftone dot position information and the size.

That is, the above-described technique tries to obtain a high-quality output result by performing processing complying with the image characteristic while reducing the amount of data to be stored. To obtain a high-quality printout by this technique, the image separation result is important. It is however difficult to always obtain satisfactory image separation results for various images. Especially, it is difficult to accurately separate an image region from an image obtained by reading a halftone image original by a scanner or the like.

In the above-described technique, only information (to be referred to as "halftone dot information" hereinafter) expressing each halftone dot is held for a region determined to be an image region by image separation. A halftone image is generated based on the held halftone dot information. Since halftone dot information is held for each halftone dot, the data amount is reduced, but the resolution still decreases.

SUMMARY OF THE INVENTION

In one aspect, an image processing apparatus comprising: a sampling unit configured to sample multi-value image data for each predetermined pixel range to generate tone information of the pixel range, and store the generated tone information in a storage unit; a generation unit configured to generate attribute information representing an attribute of a pixel from the multi-value image data, and store the generated attribute information in the storage unit; and a halftone processing unit configured to perform halftone processing on the multi-value image data based on the tone information and the attribute information that have been stored in the storage unit.

According to the aspect, the amount of data to be stored can be reduced, and degradation of an image can be prevented in an image processing apparatus which performs halftone processing. Also, output correction can be performed on stored image data.

Further features of the present invention will become apparent from the following description of exemplary embodiments with reference to the attached drawings.

BRIEF DESCRIPTION OF THE DRAWINGS

FIG. 2 is a view showing an example of a cell used in halftone processing.

FIGS. 7A and 7B are views for explaining bend correction by resampling.

DESCRIPTION OF THE EMBODIMENTS

Figure 1:
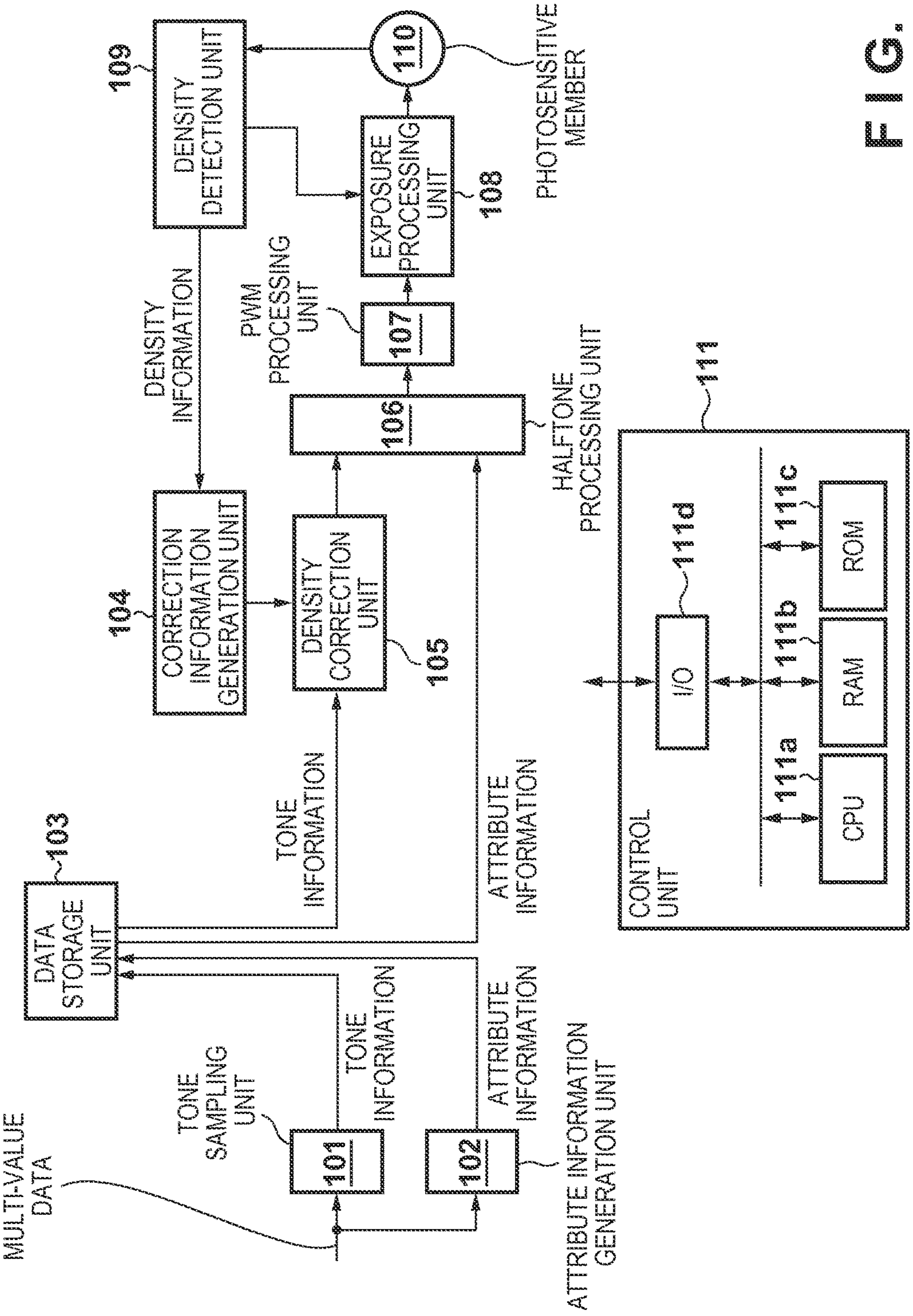
FIG. 1 is a block diagram showing the processing arrangement of an image processing apparatus according to the first embodiment.

Image processing according to each of embodiments of the present invention will now be described in detail with reference to the accompanying drawings. An image processing apparatus according to each of the embodiments has the following function: the image processing apparatus converts input multi-value image data into halftone image data having a reduced number of tonality. Then, the image processing apparatus generates a pulse width modulation signal (to be referred to as a "PWM signal" hereinafter) from the halftone image data, and scans and exposes a photosensitive member with a laser beam controlled based on the PWM signal, forming a latent image. The image processing apparatus develops the latent image with toner, and transfers and fixes the toner image onto a printing medium, forming an output image.

First Embodiment

[Processing Arrangement of Apparatus]

The processing arrangement of an image processing apparatus according to the first embodiment will be described with reference to the block diagram of FIG. 1.

The image processing apparatus receives multi-value image data (to be referred to as "multi-value data" hereinafter). The embodiment assumes that image data of 256 tones (8 bits/pixel) is input as multi-value data.

A tone sampling unit 101 samples input multi-value data for each cell used in halftone processing to be described later, and outputs tone information of each cell. That is, the tone sampling unit 101 converts tone information of each pixel of multi-value data into tone information of each cell serving as the tone reproduction unit in halftone processing.

FIG. 2 shows an example of a cell used in halftone processing. In FIG. 2, a region surrounded by a thin line represents a pixel, and a region surrounded by a thick line represents a cell. The tone sampling unit 101 samples multi-value data for each region (cell) surrounded by a thick line. As the sampling method, the average value of the values of pixels included in a cell is calculated. Alternatively, a weighted average value or additional value may be calculated.

An attribute information generation unit 102 generates attribute information representing the tone determination result of the input multi-value data. The attribute information represents three, white, gray, and black attributes as tone determination results. In the embodiment, a multi-value data value "0" indicates white, and "255" indicates black. That is, the attribute information generation unit 102 outputs attribute information representing the white attribute for a multi-value data value of 0, the black attribute for 255, and the gray attribute for a value other than 0 and 255.

Although tone information generated by the tone sampling unit 101 is information (8 bits/cell) of each cell, attribute information generated by the attribute information generation unit 102 is information (2 bits/pixel) of each pixel, similar to multi-value data. A high resolution is maintained for white and black pixels represented by multi-value data based on tone information, details of which will be described later. Note that "a high resolution is maintained" means to maintain the positions of white and black pixels in order to prevent a blur or stroke-connection of an image (for example, degradation of the edge of a character or line art).

A data storage unit 103 is, for example, a hard disk or DRAM, and stores tone information output from the tone sampling unit 101 and attribute information output from the attribute information generation unit 102.

For example, when multi-value data is 8 bits/pixel, the page size is 5,000×7,000 pixels, halftone image data is 4 bits, and the screen ruling is 212 lines (cell area is eight pixels), the data amount of information stored in the data storage unit 103 is as follows:

tone information: $8 \text{ bits} \times 5{,}000 \times 7{,}000/8 \text{ pixels}/8 \text{ bits} \approx 4.17 \text{ Mbytes}$ attribute information: $2 \text{ bits} \times 5{,}000 \times 7{,}000/8 \text{ bits} \approx 8.34 \text{ Mbytes}$ amount of stored data: $4.17+8.34=12.51 \text{ Mbytes}$ To the contrary, multi-value data is 8 bits×5,000×7,000/8 bits≈33.4 Mbytes. Thus, the storage capacity of the data storage unit 103 can be reduced by storing tone information and attribute information, rather than by storing multi-value data.

A density detection unit 109 controls an exposure processing unit 108 and the like to form, on a photosensitive member 110, a patch image (toner image) for detecting the output characteristic of an image output unit and detect the density value of the formed patch image. Note that the output characteristic changes over time in accordance with the remaining amount of toner, the cumulative number of printed sheets, the temperature and humidity of the output unit, and the like.

A correction information generation unit 104 receives, from the density detection unit 109, density information representing the density value (input density) of patch image data and the density value (output density) of a patch image. Then, the correction information generation unit 104 generates density correction information for performing density correction. The density correction information is the characteristic of an output density with respect to an input density that is held in, for example, a lookup table (LUT).

A density correction unit 105 performs output correction on tone information input from the data storage unit 103. As described above, the output correction is image processing including gamma correction processing and density correction to make image data match a characteristic (output characteristic) unique to the output unit of the image processing apparatus. More specifically, by looking up the LUT of the correction information generation unit 104, the density correction unit 105 decides an input density for obtaining an output density corresponding to input tone information. Then, the density correction unit 105 executes output correction to convert tone information into an input density. When the LUT of the correction information generation unit 104 holds discrete density values, the density correction unit 105 decides an input density by interpolation processing.

As described above, when binary data having undergone halftone processing is stored in the data storage unit 103, no density correction cannot be performed on the stored data. When multi-value data is stored in the data storage unit 103, density correction is possible, but the amount of data to be stored becomes large. In the embodiment, the storage capacity of the data storage unit 103 can be reduced, compared to storing multi-value data, and density correction complying with the output characteristic in output can be performed on the amount of stored data.

A halftone processing unit 106 receives the tone information having undergone density correction in the density correction unit 105 and attribute information stored in the data storage unit 103. Note that the halftone processing unit 106 controls readout of attribute information from the data storage unit 103 so that attribute information corresponding to tone information, in other words, tone information and attribute information of the same pixel are input. For a pixel whose attribute information represents the white attribute (white pixel) or a pixel whose attribute information represents the black attribute (black pixel), the halftone processing unit 106 generates a tone value matching the attribute. For a pixel having the gray attribute (halftone pixel), the halftone processing unit 106 generates a tone value by using the tone information and a preset threshold.

More specifically, when the attribute information represents the white attribute, the halftone processing unit 106 outputs a tone value ("0" in the embodiment) representing a white pixel as the tone value of a pixel. When the attribute information represents the black attribute, the halftone processing unit 106 outputs a tone value ("255" in the embodiment) representing a black pixel as the tone value of a pixel. When the attribute information represents the gray attribute, the halftone processing unit 106 outputs a tone value obtained by binarizing tone information based on a preset threshold. Note that the binary data output from the halftone processing unit 106 is not 1-bit binary data, but 8-bit data representing a value equivalent to a quantized representative value. That is, when tone information≤the threshold, "0" is output, and when tone information>the threshold, "255" is output.

A numeral in a cell in FIG. 2 represents a threshold number, and a threshold corresponding to each threshold number is set. Hence, there are a case in which all pixels in a cell are binarized to "0", a case in which all pixels are binarized to "255", and a case in which binary pixels "0" and binary pixels "255" coexist. In the example of FIG. 2, the sum (number of binary pixels "255") of screen pixel values in a cell is 0 (inclusive) to 32 (inclusive), and a 33-tone expression is possible for each cell.

A threshold pattern in a cell is set to convert a tone value represented by multi-value data into the number of dots expressing the tone when tone values in the cell are constant. However, the tone values of adjacent pixels in a cell are often different in a photograph of a landscape or person, and the tone value varies in the cell. If the variation of the tone value and the threshold pattern interfere with each other, moiré is generated, degrading the image quality. In the embodiment, the tone sampling unit 101 generates tone information of each cell, so a high-quality output result free from moiré can be obtained without the variation of the tone value in the cell.

If tone information of each pixel is converted into tone information of each cell, the resolution decreases, causing the above-mentioned blur or stroke-connection of the image. In the embodiment, high resolutions of white and black pixels are maintained by attribute information, and thus a high-quality output result in which the above-mentioned blur or stroke-connection of the image is prevented can be obtained.

A PWM processing unit 107 receives a tone value for each pixel from the halftone processing unit 106, and generates a PWM signal by well-known pulse width modulation. The exposure processing unit 108 receives the PWM signal to drive the laser element, and scan and expose the photosensitive member 110 with a laser beam.

A control unit 111 includes a microprocessor (CPU) 111*a*, random access memory (RAM) 111*b*, read only memory (ROM) 111*c*, and input/output port (I/O) 111*d*. The CPU 111*a* executes a program stored in the ROM 111*c* using the RAM 111*b* as a work memory, controls the operation of each unit of the above-described image processing apparatus through the I/O 111*d*, and controls image processing to be described later.

[Image Processing]

Figure 3:
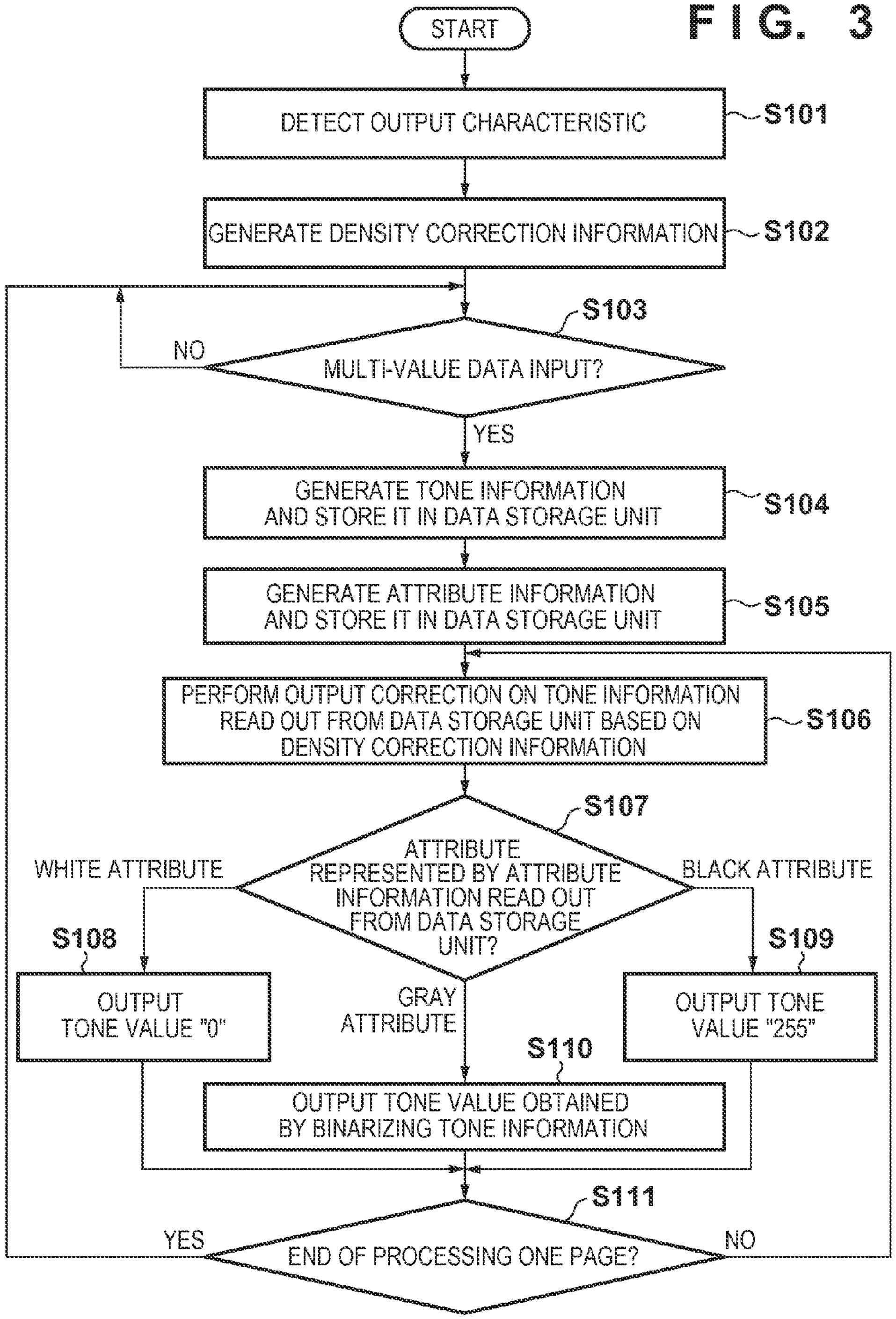
FIG. 3 is a flowchart for explaining image processing to be executed by the image processing apparatus.

Image processing to be executed by the image processing apparatus will be explained with reference to the flowchart of FIG. 3. Note that the image processing shown in FIG. 3 is executed by using the above units and supplying a program for controlling this processing to the control unit 111 or the like. Alternatively, it is possible to perform the image processing by supplying a program for implementing the image processing to a computer while hardware units such as the above units are not used.

When the image processing apparatus is turned on, the output characteristic of the image output unit is detected (S101), and density correction information is generated (S102). That is, the density detection unit 109 forms a patch image on the photosensitive member 110, and detects density information of the patch image. The correction information generation unit 104 generates density correction information based on the density information detected by the density detection unit 109.

Although detection of density information and generation of density correction information need not be performed in every print operation, they are executed as interrupt processes at the power-on timing and the following timings: the timing when no print operation has been performed for a predetermined time or longer, the timing when the temperature or humidity in the image processing apparatus has changed by a predetermined value or more, and the timing when the print operation has been performed for a predetermined number or more of sheets.

If multi-value data is input to the image processing apparatus (S103), the tone sampling unit 101 generates tone information from multi-value data and stores it in the data storage unit 103 (S104). The attribute information generation unit 102 generates attribute information from the multi-value data and stores it in the data storage unit 103 (S105).

Based on the density correction information, the density correction unit 105 performs output correction on the tone information input from the data storage unit 103 (S106). The halftone processing unit 106 receives the tone information having undergone output correction and the attribute information stored in the data storage unit 103, and branches the process based on the attribute information (S107). If the attribute information represents the white attribute, the halftone processing unit 106 outputs "0" as the tone value of the pixel (S108). If the attribute information represents the black attribute, the halftone processing unit 106 outputs "255" as the tone value of the pixel (S109). If the attribute information represents the gray attribute, the halftone processing unit 106 outputs the tone value "0" or "255" obtained by binarizing the tone information of the pixel based on, for example, the threshold shown in FIG. 2 (S110).

The processes in steps S106 to S110 are repeated till the end of processing one page (S111). After the end of processing one page, the process returns to step S103 to wait for input of the next multi-value data.

In this manner, the amount of data to be stored can be reduced in the multi-value storage method, output correction can be performed on stored data, and a line art image can be maintained at a high resolution to prevent a blur or stroke-connection of an image.

Second Embodiment

Image processing according to the second embodiment of the present invention will be described. In the second embodiment, the same reference numerals as those in the first embodiment denote the same parts, and a detailed description thereof will not be repeated.

The halftone processing unit 106 according to the first embodiment resamples tone information of each cell by deciding the tone value of a pixel based on attribute information of each pixel. The second embodiment will explain an example in which tone information is resampled in advance and then the tone value is decided based on attribute information of each pixel.

The processing arrangement of an image processing apparatus according to the second embodiment will be described with reference to the block diagram of FIG. 4. The processing arrangement according to the second embodiment is different from the processing arrangement in FIG. 1 in that a tone resampling unit 311 is interposed between a data storage unit 103 and a density correction unit 105.

The tone resampling unit 311 resamples the tone value of a pixel from tone information input from the data storage unit 103 by using a cell used in sampling by a tone sampling unit 101, thereby restoring image data having the same resolution as that of input multi-value data. Note that resampling makes the tone values of all pixels in the cell equal to the tone information regardless of the sampling method of the tone sampling unit 101.

The density correction unit 105 receives the resampled tone information from the tone resampling unit 311, and performs output correction on the tone information based on density correction information, as in the first embodiment. A halftone processing unit 106 performs halftone processing, as in the first embodiment, but need not perform resampling because already resampled tone information is input.

Modification of Embodiments

Figure 4:
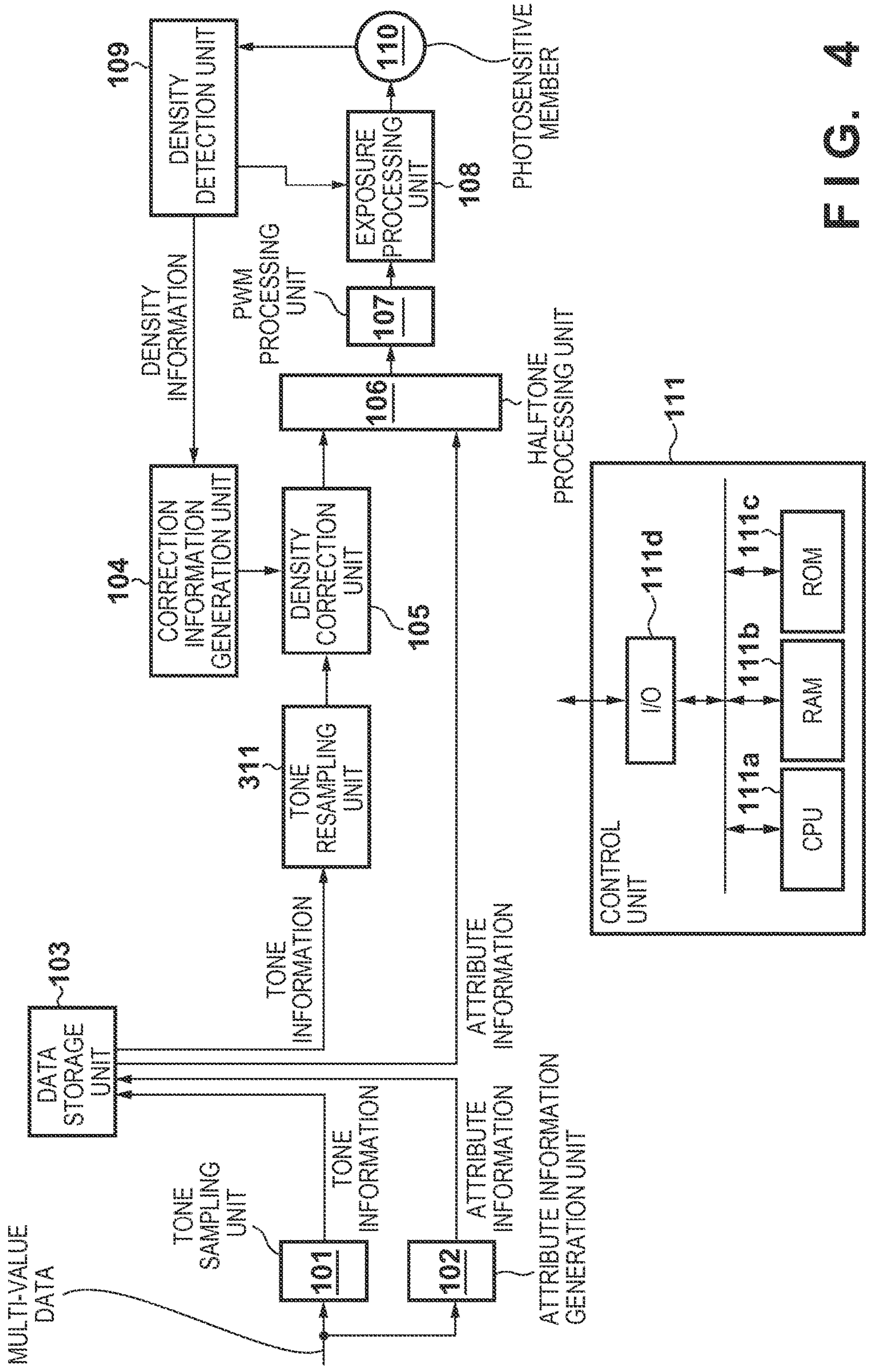
FIG. 4 is a block diagram showing the processing arrangement of an image processing apparatus according to the second embodiment.

FIG. 4 shows the processing arrangement in which output correction is performed on tone information resampled by the tone resampling unit 311. However, the same result can be obtained even when tone information having undergone output correction is resampled.

Figure 5:
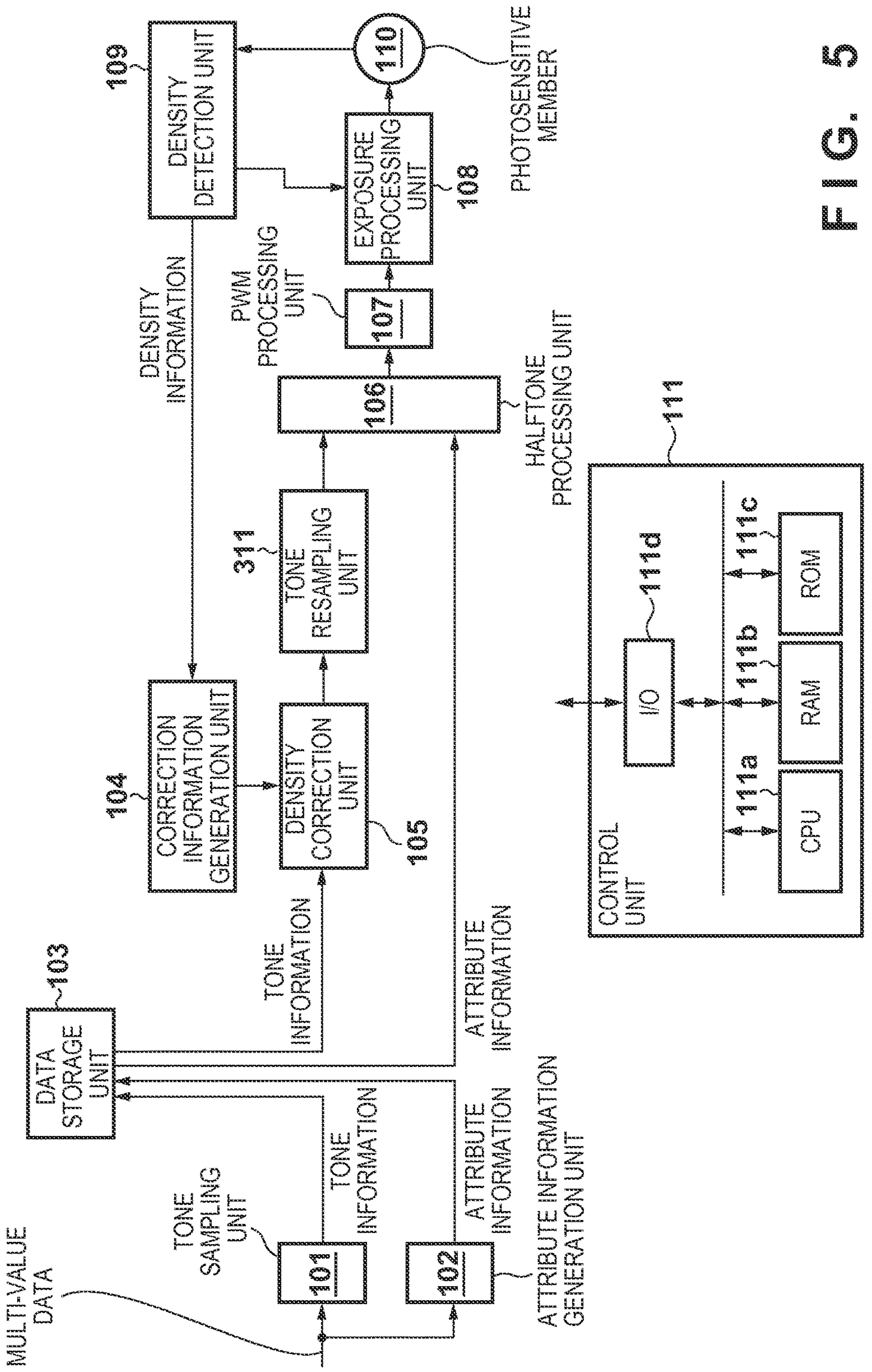
FIG. 5 is a block diagram showing the processing arrangement of an image processing apparatus according to a modification of the second embodiment.

The processing arrangement of an image processing apparatus according to a modification of the second embodiment will be described with reference to the block diagram of FIG. 5. The processing arrangement shown in FIG. 5 is different from the processing arrangement shown in FIG. 4 only in the arrangement order of the tone resampling unit 311 and density correction unit 105, and the same result can be obtained. Therefore, a detailed description of the processing arrangement in FIG. 5 will not be repeated.

The attribute information generation unit 102 in each of the first and second embodiments maintains high resolutions of white and black pixels by generating attribute information representing the three, white, black, and gray attributes, and generating attribute information representing the white and black attributes. However, only attribute information representing the two, white and gray attributes may be generated without generating attribute information representing the black attribute. In a document in which a character or line art is drawn on a white background, like a text document, dots are concentrated in the character/line art region because no dot is generated on the white background. Thus, an output image with high edge sharpness without a blur or stroke-connection of an image can be obtained.

When attribute information represents two attributes, it becomes information of 1 bit/pixel, and the storage capacity of the data storage unit 103 can be further reduced.

Third Embodiment

Image processing according to the third embodiment of the present invention will be described. In the third embodiment, the same reference numerals as those in the first and second embodiments denote the same parts, and a detailed description thereof will not be repeated.

The third embodiment will explain the processing arrangement of an image processing apparatus including pixel position correction. Various corrections are conceivable as the pixel position correction. Here, bend correction in a laser beam printer (LBP) will be exemplified.

In the LBP, if the laser scanning position and the rotation axis of a photosensitive drum do not coincide with each other, the laser track on the photosensitive drum may bend. To solve this, when reading out data from a data storage unit 103, the data readout position is shifted in a direction in which the bend of the laser track is canceled, and then drawing is performed. This processing is called bend correction.

Figure 6:
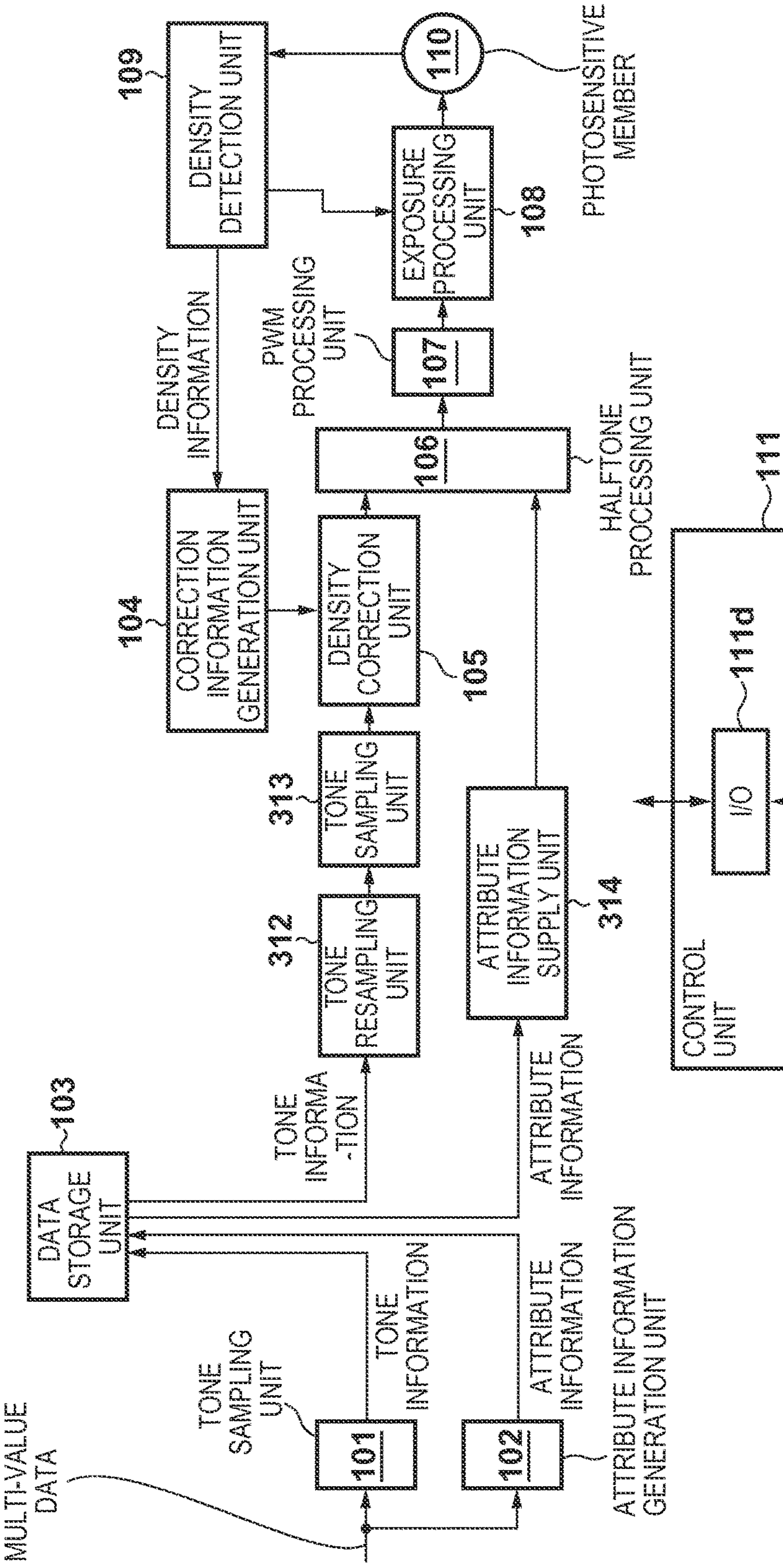
FIG. 6 is a block diagram showing the processing arrangement of an image processing apparatus according to the third embodiment.

The processing arrangement of an image processing apparatus according to the third embodiment will be described with reference to the block diagram of FIG. 6. The processing arrangement according to the third embodiment is different from the processing arrangement in FIG. 1 in the following points. First, a tone resampling unit 312 and tone sampling unit 313 are added between the data storage unit 103 and a density correction unit 105. Second, an attribute information supply unit 314 is added between the data storage unit 103 and a halftone processing unit 106.

The operation of the added tone sampling unit 313 is the same as that of the tone sampling unit 101. The processing arrangement except for the tone resampling unit 312 and attribute information supply unit 314 is the same as that in FIG. 1. Therefore, the tone resampling unit 312, tone sampling unit 313, and attribute information supply unit 314 will be explained in detail below.

Tone Resampling Unit

In the tone resampling unit 312, positional error information based on the bend of the laser track is set in advance as a profile (to be referred to as a "bend profile" hereinafter). The tone resampling unit 312 reads out tone information from the data storage unit 103 based on this profile. The tone resampling unit 312 resamples the tone value of a pixel by using a cell of the same shape as that of a cell used in sampling by a tone sampling unit 101. The cell needs to be shifted and resampled in accordance with the bend of the laser track, details of which will be described later.

Figure 7B:
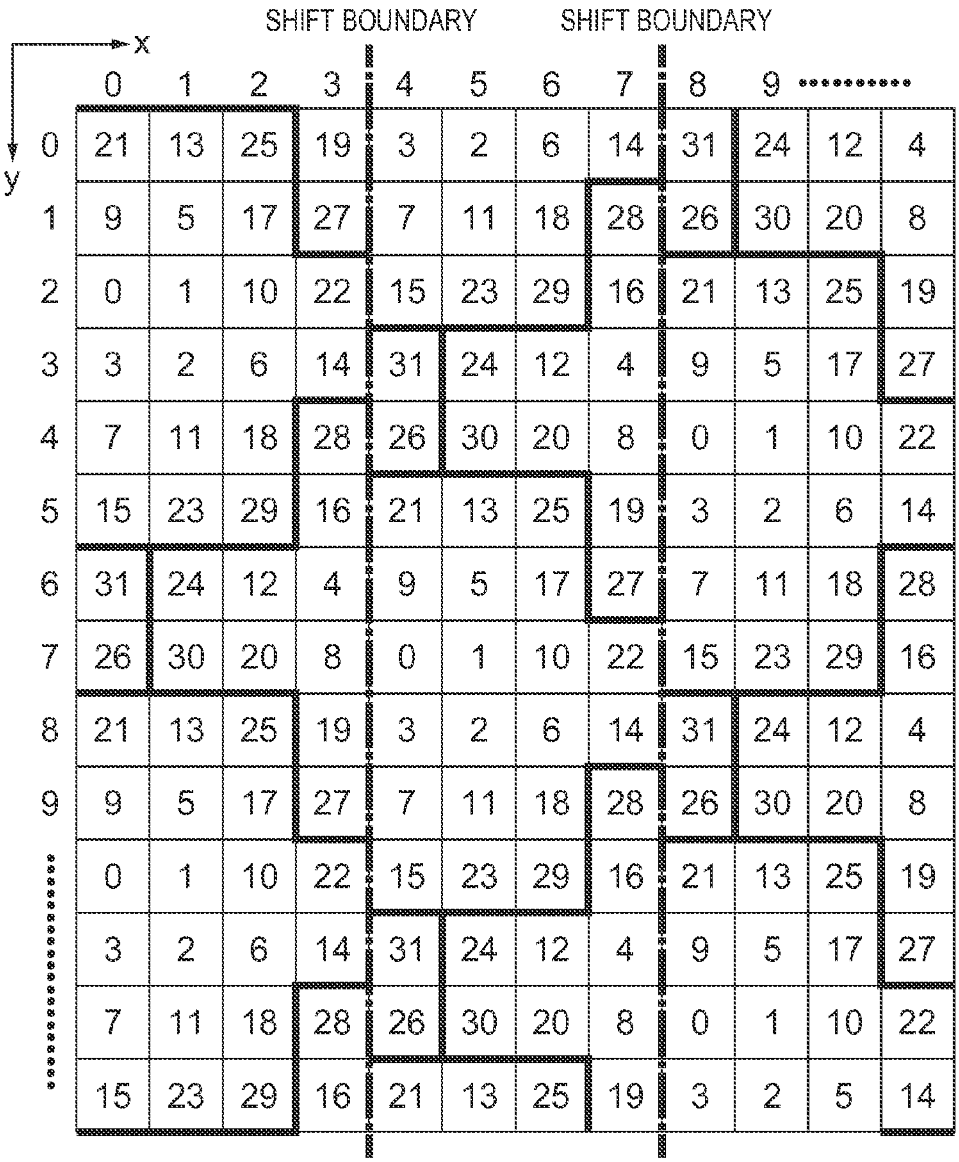

Bend correction by resampling will be explained with reference to FIGS. 7A and 7B. FIG. 7A shows the state of a cell before resampling, and FIG. 7B shows the state of a cell after resampling.

For descriptive convenience, assume that tone information is stored in each pixel of a cell. When the laser track does not bend, corresponding pieces of tone information are read out in the order of threshold number 3→2→6→14→26→30→20→8→3→ . . . on a line y=3 in the sub-scanning direction shown in FIG. 7A. When canceling the bend of the laser track, corresponding pieces of tone information are read out in the order of, for example, threshold number 3→2→6→14/31→24→12→4/9→ . . . , as shown in FIG. 7B. Note that "/" represents a shift of the tone information readout position, and is equivalent to a shift boundary indicated by a broken line in FIG. 7B.

In practice, the data storage unit 103 stores tone information (for example, the average tone value of a cell) in correspondence with, for example, only a pixel of threshold number 0 in a cell. The tone resampling unit 312 reads out tone information of a pixel (0, 2) of threshold number 0 and copies this tone information in all the pixels of the cell. At this time, pixels corresponding to threshold numbers 31 and 26 at the right end of the cell cross the shift boundary, so their pieces of tone information are copied to pixels shifted in the up or down direction (in the sub-scanning direction y) in accordance with the bend profile. FIG. 7B shows an example in which the pixels corresponding to threshold numbers 31 and 26 are shifted by one line in the down direction.

The tone resampling unit 312 reads tone information of a pixel (8, 2) shown in FIG. 7A, and copies the tone information to a pixel in accordance with the bend profile. In this cell, when viewed from the pixel (8, 2) of threshold number 0 after bend correction, the left part with respect to the shift boundary is shifted by one line in the up direction. That is, the shift direction is opposite between the right side with respect to the shift boundary and the left side with respect to the shift boundary.

After this processing continues, resampled data having undergone bend correction shown in FIG. 7B is finally obtained. Note that no tone information is obtained in a cell in which a pixel of threshold number 0 does not exist at the end of the image. In this case, for example, processing of giving a pixel value "0" to all the pixels of the cell is performed. In FIG. 7A, a cell to which a pixel (3, 0) belongs is padded with the pixel value "0".

Tone Sampling Unit

The tone sampling unit 313 samples again tone information resampled by the tone resampling unit 312. Sampling by the tone sampling unit 313 is the same as sampling by the tone sampling unit 101.

Tone information output from the tone resampling unit 312 is in a state in which the cell shape is deformed, as shown in FIG. 7B. If the tone information in which the cell shape is deformed is input to the halftone processing unit 106, image degradation sometimes occurs, in which the shift boundary is reproduced as a streak in the sub-scanning direction y. To prevent this image degradation, the tone sampling unit 313 samples again the tone information based on a cell of a normal shape, and returns the cell into a cell having no shift boundary, as shown in FIG. 7A. The returned cell matches a cell to be used by the halftone processing unit 106, the pixel value does not vary in the cell, and thus image degradation can be prevented.

Attribute Information Supply Unit

A bend profile is also set in the attribute information supply unit 314, as in the tone resampling unit 312. More specifically, the attribute information supply unit 314 also reads out attribute information from the data storage unit 103 in accordance with the bend profile. However, the attribute information is information of each pixel, and does not require resampling for each cell in readout of tone information.

As described above, when pixel position correction such as bend correction is performed after data storage, tone information in which the cell shape is deformed after bend correction is sampled again, and the cell can be returned to a cell of a normal shape.

Fourth Embodiment

Image processing according to the fourth embodiment of the present invention will be described. In the fourth embodiment, the same reference numerals as those in the first to third embodiments denote the same parts, and a detailed description thereof will not be repeated.

In the fourth embodiment, tone information and attribute information independent of the screen shape are stored in a data storage unit 103. Then, the tone information read out from the data storage unit 103 is sampled again in accordance with halftone processing.

According to this method, for example, information independent of the printer engine can be stored in, for example, a server on a network, and various printers can output the image via a cloud service or the like. Further, since the tone information and the attribute information independent of the screen shape are stored in the data storage unit 103, even in the process of which reading order of data from the data storage unit 103 is changed such as the bend correction, the address generation of the data storage unit 103 is facilitated.

Figure 8:
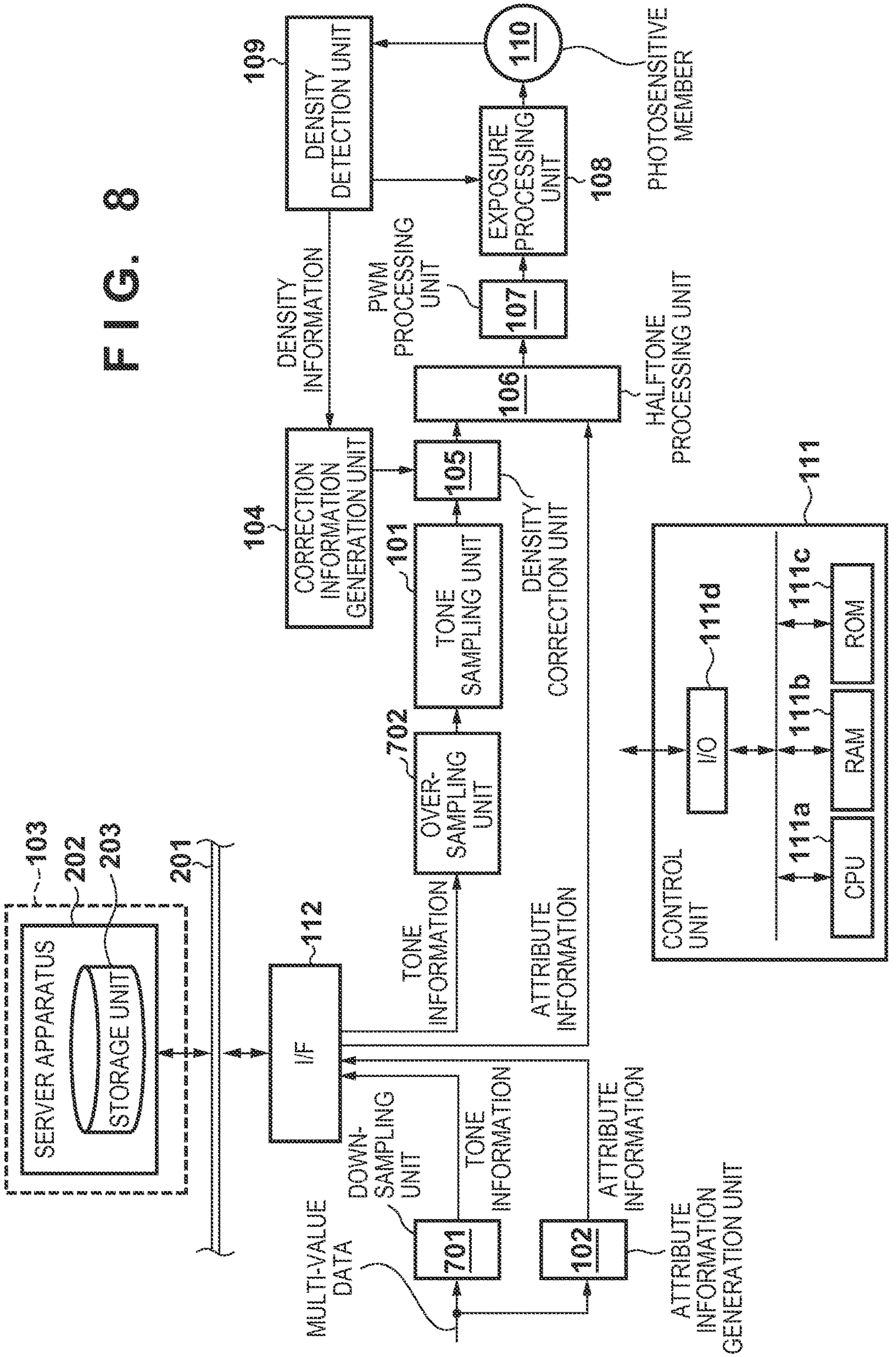
FIG. 8 is a block diagram showing the processing arrangement of an image processing system according to the fourth embodiment.

The processing arrangement of an image processing system according to the fourth embodiment will be described with reference to the block diagram of FIG. 8. The image processing system receives multi-value data of, for example, 256 tones (8 bits/pixel). A downsampling unit 701 samples the input multi-value data for each predetermined pixel range. In other words, multi-value data having tone information of each pixel is converted into tone information of each predetermined pixel range by sampling.

Figure 9:
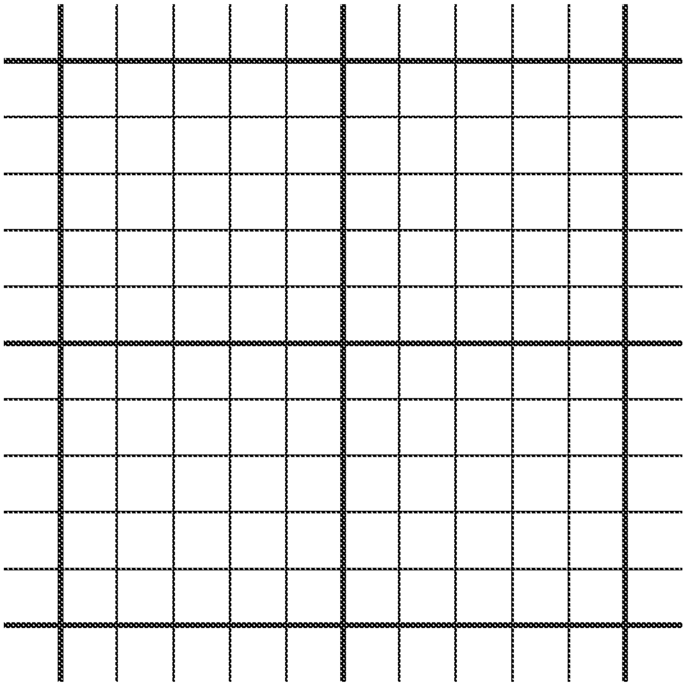
FIG. 9 is a view showing an example of a pixel range used by a downsampling unit.

FIG. 9 shows an example of a pixel range used by the downsampling unit 701. In FIG. 9, a rectangular region surrounded by a thick line is an example of the pixel range, and the rectangular region includes a plurality of pixels. The downsampling unit 701 samples multi-value data for each rectangular region, and calculates an average value, weighted average value, or additional value in the rectangular region as tone information. Note that the pixel range shown in FIG. 9 has an area of 25 pixels. The area is equal to or smaller than the area of a cell in halftone processing (for example, 32 pixels or less when the cell shown in FIG. 2 is used in halftone processing).

As in the first embodiment, an attribute information generation unit 102 generates attribute information of each pixel from input multi-value data.

The data storage unit 103 is, for example, a hard disk or DRAM, and stores tone information (8 bits/rectangular region) output from the downsampling unit 701, and attribute information (2 bits/pixel or 1 bit/pixel) output from the attribute information generation unit 102. When a storage unit 203 of a server apparatus 202 on a wired or wireless network 201 is used as the data storage unit 103, transmission/reception of tone information and attribute information to/from the server apparatus 202 is performed via a network interface (I/F) 112.

An oversampling unit 702 resamples the tone value of a pixel from tone information input from the data storage unit 103 by using a rectangular region used in sampling by the downsampling unit 701, thereby restoring image data having the same resolution as that of input multi-value data. Note that resampling makes the tone values of all pixels in the rectangular region equal to the tone information regardless of the sampling method of the downsampling unit 701.

As in the first embodiment, a tone sampling unit 101 samples the tone information resampled by the oversampling unit 702 for each cell used in halftone processing and outputs tone information of each cell.

As in the first embodiment, a density correction unit 105 performs output correction on the tone information output from the tone sampling unit 101. As in the first embodiment, a halftone processing unit 106 receives the tone information having undergone density correction in the density correction unit 105 and attribute information stored in the data storage unit 103, and executes halftone processing. The subsequent processing is the same as that in the first embodiment, and a detailed description thereof will not be repeated.

In the embodiment, the data storage unit 103 stores tone information and attribute information independent of the cell shape in halftone processing. Even if the cell shape in halftone processing is different in processes after the tone sampling unit 101, processes before the oversampling unit 702 need not be changed.

In the fourth embodiment, to maintain a high resolution and obtain a high-quality output image, the area of a pixel range used in sampling by the downsampling unit 701 needs to be smaller than the area of a cell in halftone processing. While, the quality of an output image and the storage capacity of the data storage unit 103 have a tradeoff relationship. If the maintenance of a high resolution is dispensable and the storage capacity of the data storage unit 103 is small or is to be reduced, the area of a pixel range used in sampling by the downsampling unit 701 may be set to be larger than the area of a cell in halftone processing.

Further, when it is set that the area of a pixel range used in sampling by the downsampling unit 701 is larger than the area of a cell in halftone processing, high frequency components above the frequency corresponding to a period of the halftone processing hardly appear in the tone information after the downsampling unit 701, thus the tone sampling unit 101 may be omitted.

Further, since the tone information is stored in the data storage unit 103 in a rectangular unit, even in the process of which reading order of data from the data storage unit 103 is different from writing order of data to the data storage unit 103 such as the bend correction, the skew correction, and the rotation processing, the address generation of the data storage unit 103 is facilitated. For example, in the case of a pixel range as shown in FIG. 9, the coordinates of the rectangle corresponding to the coordinates (x, y) of the pixel are (Int(x/5), Int(y/5)), where Int(X) represents an integer portion of the value X. Furthermore, at the end of the image, when the tone information is stored in a cell unit, the end becomes jagged (jaggy occurs) depending on a screen angle (cell shape), thus an end treatment is required. In contrast, when the tone information is stored in the rectangular unit, the jaggy does not occur on the end, thus it is sufficient to perform round-up processing (or round-down processing) of a fraction occurs when dividing by the number of pixels in the vertical or horizontal of the rectangular as the end treatment.

Further, it can be easily to store tone information and attribute information which are data compressed. Both data to be stored represent a tone level having a high correlation between pixels, thus the data can be compressed efficiently. Lossless coding is appropriate for attribute information that a pixel position is important. On the other hand, a low frequency component is important in tone information, thus lossy coding is appropriate for the tone information in consideration of compression efficiency. Accordingly, when the attribute information is lossless-coded and the tone information is lossy-coded, the image quality after halftone processing can be maintained, and efficient data compression is implemented.

Modification of Fourth Embodiment

Figure 10:
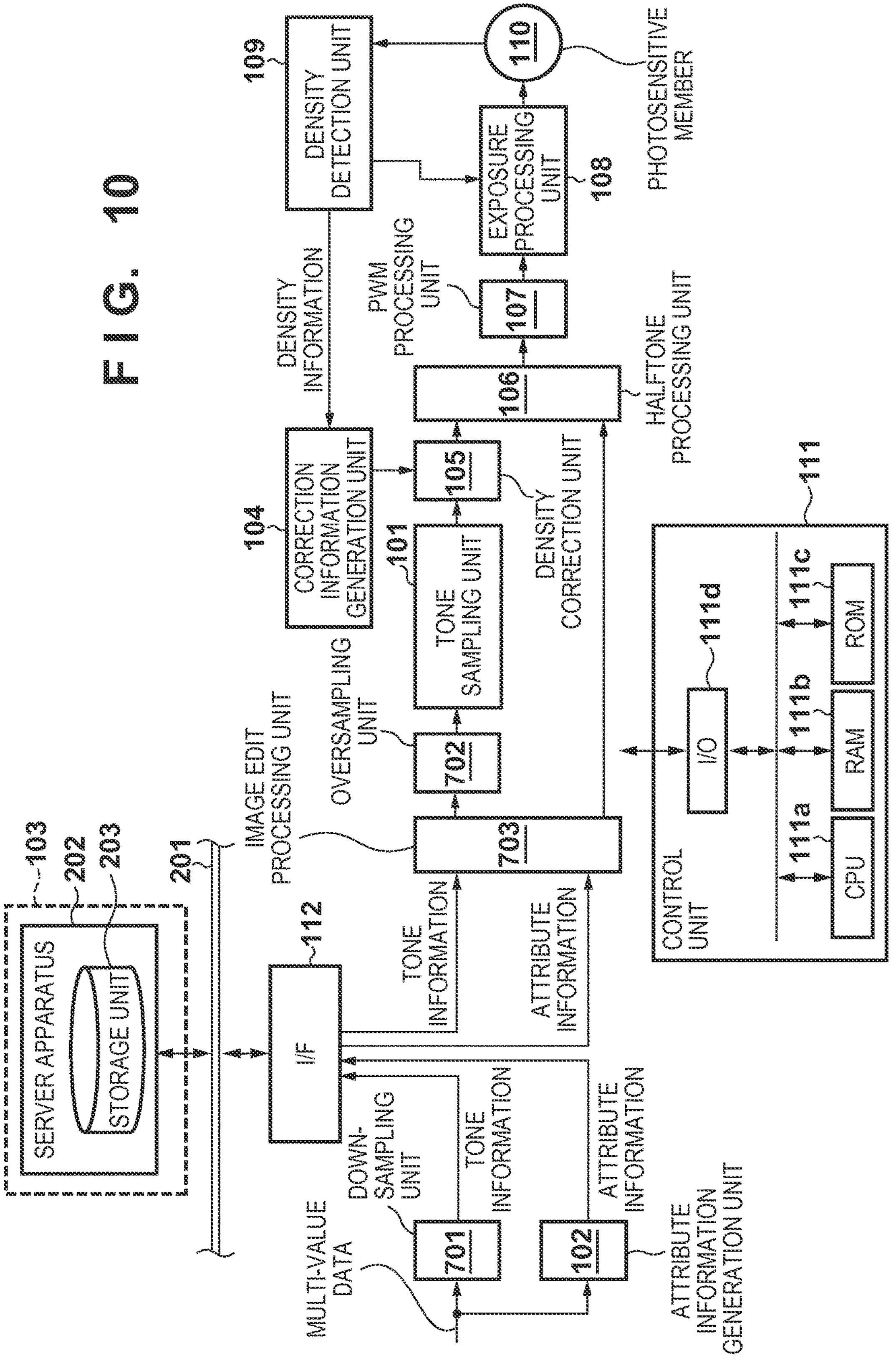
FIG. 10 is a block diagram showing the processing arrangement of an image processing system according to a modification of the fourth embodiment.

The processing arrangement of an image processing system according to a modification of the fourth embodiment will be described with reference to the block diagram of FIG. 10. This processing arrangement is different from the processing arrangement according to the fourth embodiment shown in FIG. 8 in that an image edit processing unit 703 is added between the data storage unit 103 and the oversampling unit 702 and between the data storage unit 103 and the halftone processing unit 106.

The image edit processing unit 703 performs rotation processing on tone information and attribute information stored in the data storage unit 103. That is, rotation processing is implemented by reading out data at a position corresponding to the rotation processing from the data storage unit 103.

The image edit processing unit 703 is arranged on the subsequent stage of the data storage unit 103. Thus, for example, when A4-size printing sheets run out while a document of a plurality of pages is printed, rotation processing can be performed to use A4-size printing sheets in an A4R paper cassette and continue printing.

Processing of the image edit processing unit 703 is not limited to rotation processing. The image edit processing unit 703 can also perform the above-described bend correction, skew correction of an original image read by a scanner, and the like.

The above-described embodiments and modifications have explained an example in which multi-value monochrome image data is handled. However, a modification to an arrangement in which multi-value color image data is handled will readily occur to those skilled in the art.

For example, processing arrangements each shown in FIG. 1 are prepared by the number of colors (for example, four colors) of color materials. Note that the number of photosensitive members 110 may be one. C, M, Y, and K data are generated by performing color separation processing on R, G, and B image data, and are respectively input as multi-value data to the four processing arrangements.

If a color separation processing unit or under color removal (UCR) processing unit is arranged on the subsequent stage of the data storage unit 103, R, G, and B data or C, M, and Y data can be input as multi-value data into the processing arrangements, and the storage capacity of the data storage unit 103 can be suppressed to a storage capacity for three colors.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-118305, filed Jun. 4, 2013 and 2014-102733, filed May 16, 2014, which are hereby incorporated by reference herein in their entirety.

What is claimed is:

1. An image processing apparatus comprising:

one or more processors; and at least one memory coupled to the one or more processors, the at least one memory having instructions stored thereon which, when executed by the one or more processors, cause the image processing apparatus to:

determine tone information from pixel values of pixels included in each predetermined region which is constructed by a plurality of pixels of multi-value image data, thereby converting tone information for each pixel into tone information for each predetermined region, and store the tone information for each predetermined region in a storage unit;

generate attribute information representing an attribute of a pixel from the multi-value image data, the attribute information representing that each pixel of the multi-value image data is any one of a white pixel, a gray pixel, and a black pixel, and store the generated attribute information, separately from the tone information, in the storage unit; and generate halftone image data corresponding to the multi-value image data based on the tone information for each predetermined region and the attribute information that have been stored in the storage unit.

2. The image processing apparatus according to claim 1, wherein the at least one memory has further instructions stored thereon which, when executed by the one or more processors, cause the image processing apparatus to:

read out the tone information for each predetermined region from the storage unit, and restore, from the readout tone information for each predetermined region, image data having a same resolution as the multi-value image data so as to supply the restored image data; and generate the halftone image data based on the restored image data and the attribute information stored in the storage unit.

3. The image processing apparatus according to claim 2, wherein the predetermined region is a unit area for reproduction of a tone.

4. The image processing apparatus according to claim 2, wherein the predetermined region is a rectangular region of an area not smaller than a unit area for reproduction of a tone.

5. The image processing apparatus according to claim 1, wherein the at least one memory has further instructions stored thereon which, when executed by the one or more processors, cause the image processing apparatus to:

read out the tone information for each predetermined region from the storage unit, and restore, from the readout tone information for each predetermined region, image data having a same resolution as the multi-value image data;

generate tone information for each unit area for reproduction of a tone from the restored image data for the unit area so as to supply the tone information for the unit area; and generate the halftone image data based on the tone information for the unit area and the attribute information stored in the storage unit.

6. The image processing apparatus according to claim 5, wherein the predetermined region is a rectangular region of an area not larger than the unit area.

7. The image processing apparatus according to claim 1, wherein the at least one memory has further instructions stored thereon which, when executed by the one or more processors, cause the image processing apparatus to perform correction processing based on an output characteristic of an image output unit on the tone information for each predetermined region read out from the storage unit so as to supply the tone information having undergone the correction processing.

8. The image processing apparatus according to claim 7, wherein the at least one memory has further instructions stored thereon which, when executed by the one or more processors, cause the image processing apparatus to:

read out the tone information for each predetermined region from the storage unit in accordance with positional error information of the image output unit, and restore, from the readout tone information for each predetermined region, image data having a same resolution as the multi-value image data;

generate tone information for each unit area for reproduction of a tone from the restored image data for the unit area so as to supply the tone information for the unit area; and read out the attribute information from the storage unit in accordance with the positional error information of the image output unit so as to supply the readout attribute information.

9. The image processing apparatus according to claim 7, wherein the at least one memory has further instructions stored thereon which, when executed by the one or more processors, cause the image processing apparatus to restore image data having a same resolution as the multi-value image data from the tone information for each predetermined region stored in the storage unit so as to supply the restored image data.

10. The image processing apparatus according to claim 7, wherein the at least one memory has further instructions stored thereon which, when executed by the one or more processors, cause the image processing apparatus to:

restore image data having a same resolution as the multi-value image data from the tone information for each predetermined region stored in the storage unit; and generate tone information for each unit area for reproduction of a tone from the restored image data for the unit area so as to supply the tone information for the unit area.

11. The image processing apparatus according to claim 2, wherein the at least one memory has further instructions stored thereon which, when executed by the one or more processors, cause the image processing apparatus to restore the image data by copying the tone information for each predetermined region to all pixels included in the predetermined region.

12. The image processing apparatus according to claim 1, wherein the at least one memory has further instructions stored thereon which, when executed by the one or more processors, cause the image processing apparatus to perform image edit processing on the tone information for each predetermined region and the attribute information that have been stored in the storage unit.

13. The image processing apparatus according to claim 12, wherein the image edit processing comprises at least one of rotation processing or skew correction.

14. The image processing apparatus according to claim 1, wherein the at least one memory has further instructions stored thereon which, when executed by the one or more processors, cause the image processing apparatus to calculate an average value of the pixel values of the pixels included in each predetermined region as the tone information of the predetermined region.

15. The image processing apparatus according to claim 1, wherein, in a case when the attribute information of a pixel represents the white pixel or the black pixel, an output value is outputted corresponding to the white pixel or the black pixel as the halftone image data, and wherein, in another case when the attribute information of a pixel represents the gray pixel, an output value is outputted corresponding to the tone information for each predetermined region on which halftone processing is performed as the halftone image data.

16. The image processing apparatus according to claim 1, wherein the tone information for each predetermined region is compressed and stored in the storage unit, and wherein the attribute information is compressed and stored in the storage unit.

17. The image processing apparatus according to claim 16, wherein the tone information for each predetermined region is compressed by using lossy coding, and the attribute information is compressed by using lossless coding.

18. The image processing apparatus according to claim 1, wherein the at least one memory has further instructions stored thereon which, when executed by the one or more processors, cause the image processing apparatus to communicate with a server apparatus on a network, wherein the storage unit comprises a storage unit of the server apparatus.

19. A method of image processing, the method comprising:

determining tone information from pixel values of pixels included in each predetermined region which is constructed by a plurality of pixels of multi-value image data, thereby converting tone information for each pixel into tone information for each predetermined region;

storing the tone information for each predetermined region in a storage unit;

generating attribute information representing an attribute of a pixel from the multi-value image data, and the attribute information representing that each pixel of the multi-value image data is any one of a white pixel, a gray pixel, and a black pixel;

storing the generated attribute information, separately from the tone information, in the storage unit; and generating halftone image data corresponding to the multi-value image data based on the tone information for each predetermined region and the attribute information that have been stored in the storage unit.

20. A non-transitory computer readable medium storing a computer-executable program for causing a computer to perform an image processing method, the method comprising:

determining tone information from pixel values of pixels included in each predetermined region which is constructed by a plurality of pixels of multi-value image data, thereby converting tone information for each pixel into tone information for each predetermined region;

storing the tone information for each predetermined region in a storage unit;

generating attribute information representing an attribute of a pixel from the multi-value image data, and the attribute information representing that each pixel of the multi-value image data is any one of a white pixel, a gray pixel, and a black pixel;

storing the generated attribute information, separately from the tone information, in the storage unit; and generating halftone image data corresponding to the multi-value image data based on the tone information for each predetermined region and the attribute information that have been stored in the storage unit.

21. The image processing apparatus according to claim 1, wherein the at least one memory has further instructions stored thereon which, when executed by the one or more processors, cause the image processing apparatus to convert the multi-value image data having $M \times N$ pixels in which each pixel value has K bits into the tone information for each predetermined region having $m \times n$ pixels in which each pixel value has K bits, wherein M and N are positive integers, K is a positive integer, m and n are positive integers, $M>m$, and $N>n$, wherein the attribute information is generated having $M \times N$ pixels in which each pixel value has k bits, wherein k is a positive integer and $K>k$, and wherein the halftone image data is generated having $M \times N$ pixels in which a bit depth of each pixel value is less than K bits.

22. The image processing apparatus according to claim 1, wherein the storage unit stores the tone information and the attribute information instead of the multi-value image data, and does not store the multi-value image data input to the image processing apparatus.

23. The image processing apparatus according to claim 1, wherein the storage unit stores the tone information and the attribute information instead of the multi-value image data to synchronize with an operation of outputting data from the image processing apparatus.

24. An image processing apparatus comprising:

one or more processors; and at least one memory coupled to the one or more processors, the at least one memory having instructions stored thereon, which, when executed by the one or more processors, cause the image processing apparatus to:

receive multi-value image data from a host computer, the multi-value image data comprising a plurality of pixels forming one or more predetermined regions, each pixel of the plurality of pixels having a pixel value;

determine tone information from pixel values of pixels included in each predetermined region to thereby convert tone information for each of the pixels into tone information for each predetermined region;

store the tone information for each predetermined region in a storage unit;

generate attribute information of a pixel from the multi-value image data, the attribute information identifying the pixel from the multi-value image data as being one of a white pixel, a gray pixel, or a black pixel;

store the attribute information, separately from the tone information, in the storage unit; and generate halftone image data corresponding to the multi-value image based on the stored tone information and the stored attribute information.

25. A method of controlling an image processing apparatus, the method comprising:

receiving multi-value image data from a host computer, the multi-value image data comprising a plurality of pixels forming one or more predetermined regions, each pixel of the plurality of pixels having a pixel value;

determining tone information from pixel values of pixels included in each predetermined region to thereby convert tone information for each of the pixels into tone information for each predetermined region;

storing the tone information for each predetermined region in a storage unit;

generating attribute information of a pixel from the multi-value image data, the attribute information identifying the pixel from the multi-value image data as being one of a white pixel, a gray pixel, or a black pixel;

storing the attribute information, separately from the tone information, in the storage unit; and generating halftone image data corresponding to the multi-value image based on the stored tone information and the stored attribute information.

26. A non-transitory computer readable medium storing a computer-executable program for causing a computer to perform an image processing method, the method comprising:

receiving multi-value image data from a host computer, the multi-value image data comprising a plurality of pixels forming one or more predetermined regions, each pixel of the plurality of pixels having a pixel value;

determining tone information from pixel values of pixels included in each predetermined region to thereby convert tone information for each of the pixels into tone information for each predetermined region;

storing the tone information for each predetermined region in a storage unit;

generating attribute information of a pixel from the multi-value image data, the attribute information identifying the pixel from the multi-value image data as being one of a white pixel, a gray pixel, or a black pixel;

storing the attribute information, separately from the tone information, in the storage unit; and generating halftone image data corresponding to the multi-value image based on the stored tone information and the stored attribute information.

* * * * *